(12) United States Patent
Finkenbinder et al.

(10) Patent No.: US 7,459,819 B2
(45) Date of Patent: Dec. 2, 2008

(54) ELECTRIC MOTOR AND BRUSH RETAINING ASSEMBLY

(75) Inventors: David B. Finkenbinder, Ravenna, OH (US); Jeffrey D. Marsden, Stow, OH (US); R. Craig Miller, Uniontown, OH (US); Huanbo Wu, Cuyahoga Falls, OH (US)

(73) Assignee: Ametek, Inc., Kent, OH (US)

( * ) Notice: Subject to any disclaimer, the term of this patent is extended or adjusted under 35 U.S.C. 154(b) by 0 days.

(21) Appl. No.: 11/580,815

(22) Filed: Oct. 13, 2006

(65) Prior Publication Data

US 2007/0029892 A1 Feb. 8, 2007

Related U.S. Application Data

(60) Continuation of application No. 10/693,745, filed on Oct. 25, 2003, now Pat. No. 7,132,777, which is a division of application No. 09/970,360, filed on Oct. 1, 2001, now Pat. No. 6,703,754.

(51) Int. Cl.
*H02K 39/00* (2006.01)
(52) U.S. Cl. .......................... 310/91; 310/239; 310/58
(58) Field of Classification Search .................. 310/91, 310/239, 238, 52, 88
See application file for complete search history.

(56) References Cited

U.S. PATENT DOCUMENTS

| | | | |
|---|---|---|---|
| 2,852,710 A | 9/1958 | Foster | |
| 3,171,050 A | 2/1965 | Gordon | |
| 3,231,772 A | 1/1966 | Polenschat | |
| 3,558,949 A | 1/1971 | Evans | 310/239 |
| 3,784,855 A | 1/1974 | Motegi et al. | 310/227 |
| 3,919,574 A | 11/1975 | Schmuck | 310/68 |
| 4,092,556 A | 5/1978 | Mabuchi | 310/57 |
| 4,166,968 A | 9/1979 | Prittie | 310/239 |
| 4,250,422 A | 2/1981 | Tahara et al. | 310/227 |
| 4,593,220 A | 6/1986 | Cousins et al. | 310/239 |
| 4,746,828 A * | 5/1988 | Nado et al. | 310/90 |
| 4,769,572 A | 9/1988 | Voigt | 310/68 |
| 4,800,312 A | 1/1989 | Wacek et al. | 310/239 |
| 4,908,538 A | 3/1990 | Geberth, Jr. | 310/59 |
| 5,448,122 A | 9/1995 | Shiroyama et al. | 310/247 |
| 5,610,467 A | 3/1997 | Shiah et al. | 310/239 |
| 5,731,650 A | 3/1998 | Scheucher | 310/248 |
| 5,949,173 A | 9/1999 | Wille et al. | 310/220 |
| 6,031,313 A | 2/2000 | Sugai et al. | 310/239 |
| 6,097,128 A * | 8/2000 | Ko | 310/239 |
| 6,100,617 A | 8/2000 | Carter et al. | 310/90 |
| 6,518,686 B2 | 2/2003 | Campbell et al. | 310/239 |
| 6,552,464 B1 | 4/2003 | Rahbar et al. | 310/239 |
| 6,703,754 B1 | 3/2004 | Finkenbinder et al. | 310/227 |
| 6,736,615 B1 | 5/2004 | Ciccarelli, Jr. et al. | 417/423.12 |
| 6,744,170 B1 | 6/2004 | Du et al. | 310/242 |
| 7,132,777 B2 | 11/2006 | Finkenbinder et al. | 310/239 |

* cited by examiner

*Primary Examiner*—Dang D Le
(74) *Attorney, Agent, or Firm*—Renner Kenner Greive Bobak Taylor & Weber

(57) ABSTRACT

The present invention generally provides a motor-fan unit including a motor assembly having a shaft, a commutator supported on the shaft, and a pair of brushes in electrical contact with the commutator, a fan assembly having an impeller coupled to the shaft, an end plate assembly located between the impeller and the motor assembly said end plate assembly including a plate portion defining an opening through which the shaft passes, wherein said commutator is located near the opening, and a pair of brush retainers adapted to receive the brushes formed on the plate portion adjacent said commutator, the brush retainers opening toward the fan assembly.

4 Claims, 14 Drawing Sheets

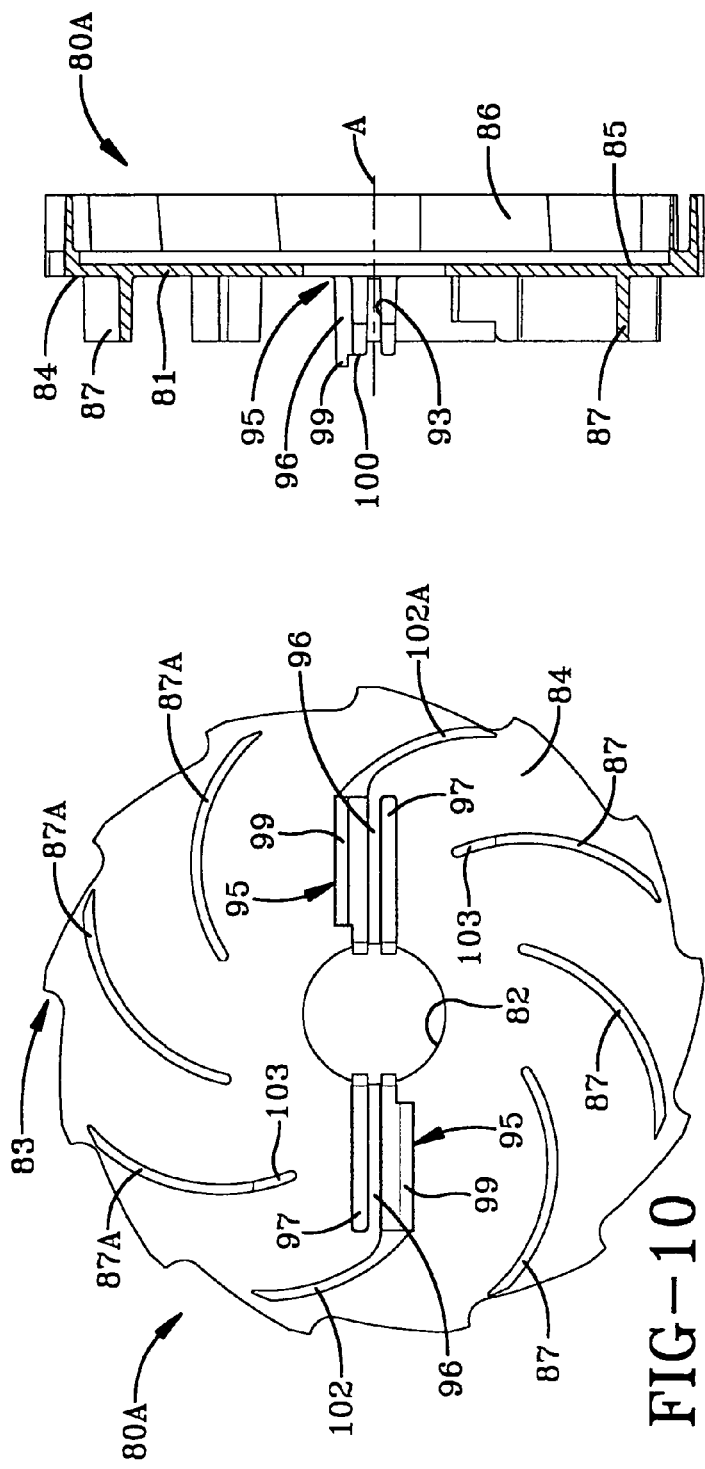
FIG-10
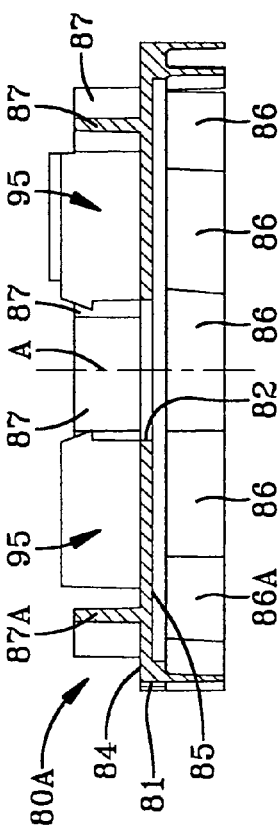
FIG-12
FIG-11

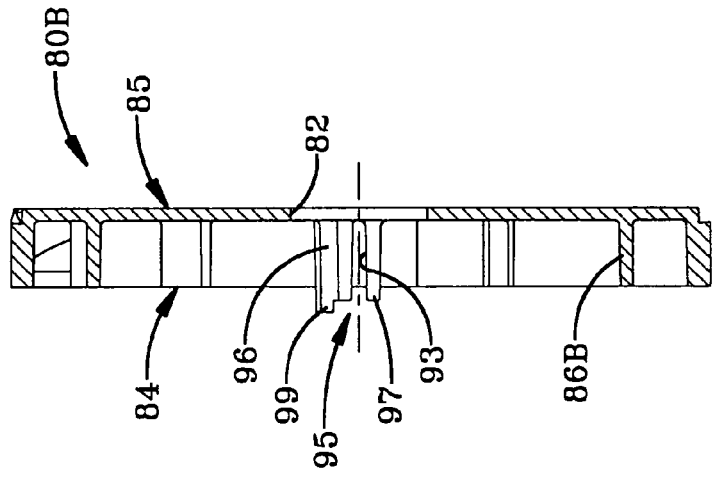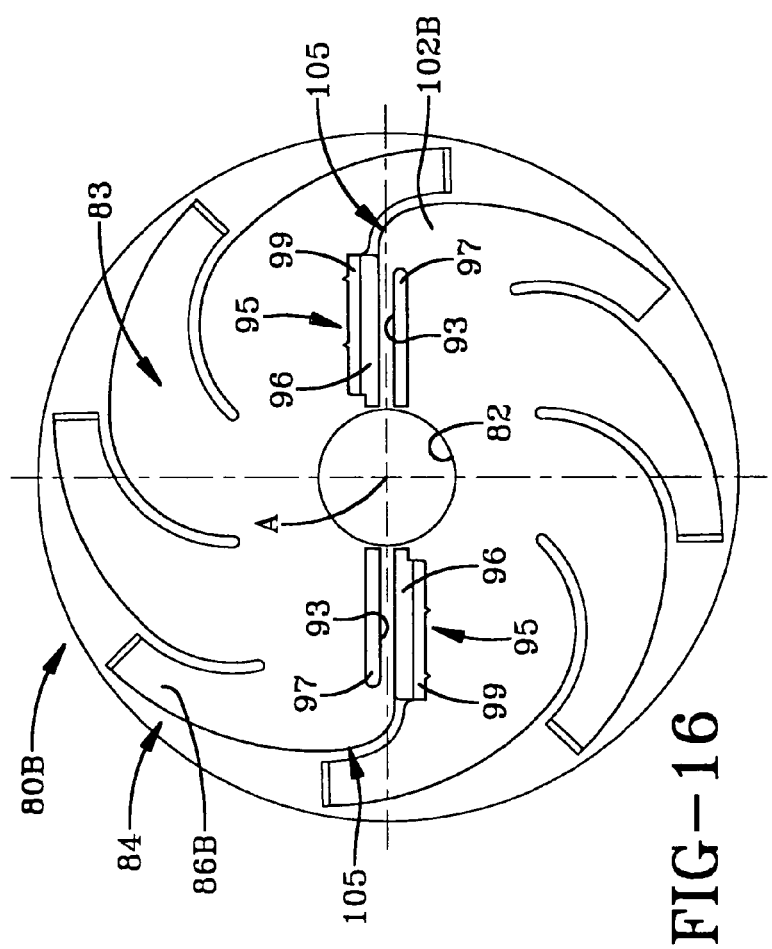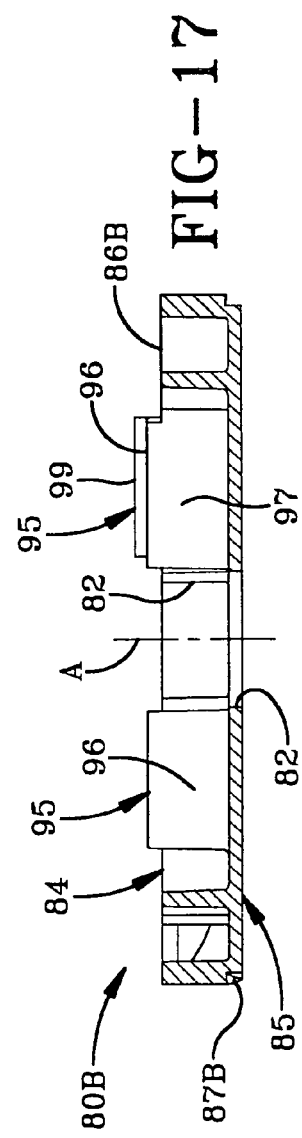

ELECTRIC MOTOR AND BRUSH RETAINING ASSEMBLY

CROSS-REFERENCE TO RELATED APPLICATIONS

This application is a continuation of prior application Ser. No. 10/693,745, filed Oct. 25, 2003 now U.S. Pat. No. 7,132,777; which is a divisional application of prior application Ser. No. 09/970,360, filed Oct. 1, 2001, which is now U.S. Pat. No. 6,703,754.

TECHNICAL FIELD

The present invention generally relates to electric motors or generators. More particularly, the present invention relates to electric motors having a brush assembly used to create an electrical connection between a power supply and a commutator. Most particularly, the present invention relates to a motor-fan unit having an end plate and a diffuser that when assembled secure the brush assembly in operative relation with the commutator.

BACKGROUND OF THE INVENTION

Electronic motors and generators are well known in the art and have been put to use in a variety of applications. One application is the handling of air. In these circumstances an electric motor is coupled with a fan to create a flow or vacuum as necessary. Often, the fan is used to provide cooling air to the motor. In these instances, a fan mounted on a shaft driven by the motor draws air into a fan shroud to compress or pressurize the air. The pressurized air is released into the motor housing via one or more ports which direct the air across the motor windings to draw heat into the flow and exhaust it from the motor housing.

The motor includes several components including field windings that surround a centrally located shaft, which is rotatably mounted in suitable bearings. A commutator is mounted on the shaft and placed in electrical contact with a power supply by a pair of opposed brushes contacting the commutator. In most motors found in the industry, the motor's components are supported on a skeletal frame, which is often made of metal to provide adequate support. Recently, non-metal molded motor frames and housings have been used to reduce the weight of the motor and reduce the leakage prevalent in skeletal designs. In either case, the commutator brushes must be supported by the motor frame. In skeletal frames, a shelf is provided adjacent the commutator with the brush supported thereon. A U-shaped clip is placed over the brush and fastened to the shelf, by screws, to secure the brush next to the commutator. In the non-metal frames, tube-like fittings are provided to support the brushes. These fittings add complexity to the molding of the motor components and often require the use of mandrels or sacrificial molding techniques. While it is desirable to use molded products in the construction of motor-fan assemblies to reduce leakage and improve efficiency, the additional complexity of molding the brush fittings reduces the ability of such devices to remain cost effective. Additionally, these fittings are closed off from the cooling air stream reducing the heat transfer rate at the brushes. The reduced heat transfer at the brushes, thus, reduces the efficiency of the motor. Therefore, there is a need for a motor-fan unit that addresses at least one of these deficiencies in the art.

SUMMARY OF THE INVENTION

It is, therefore, an object of the present invention to provide a motor-fan unit employing a more simply molded brush retainer. It is another object of the present invention to provide a brush retainer that is formed such that it is open in the axial direction.

Another object of the present invention is to provide a motor-fan unit having a brush retainer that is in fluid communication with the air flow generated by the fan, such that the brush receives cooling air therefrom.

In view of at least one of these objects, the present invention generally provides a motor-fan unit including a motor assembly having a shaft, a commutator supported on the shaft, and a pair of brushes in an electrical contact with the commutator, a fan assembly having an impeller coupled to the shaft, an end plate assembly located between the impeller and the motor assembly, said end plate assembly including a plate portion defining an opening through which the shaft passes, wherein said commutator is located near the opening, and a pair of brush retainers adapted to receive the brushes formed on the plate portion adjacent said commutator, the brush retainers opening toward the fan assembly.

The present invention further provides an end plate assembly in a motor-fan unit including a plate portion and a bracket portion adapted to be attached to the motor, the plate portion having a commutator receiver formed thereon, the commutator receiver defining a well that at least partially receives the commutator.

The present invention further provides a diffuser in a motor-fan unit including a plurality of channeling members spaced about a central bore, and a pair of brush cap projections extending axially motor in toward the motor-fan unit.

The present invention further provides a combination diffuser assembly and end plate assembly in a motor-fan unit including an end plate assembly having a plate portion, a pair of brush retainers extending axially toward the motor from the plate portion defining a mouth that opens toward the diffuser assembly, a pair of projections formed on the diffuser assembly corresponding to the brush retainers and at least partially extending into the mouth.

BRIEF DESCRIPTION OF THE DRAWINGS

FIG. 10 is a plan view of a radial diffuser according to present invention depicting a pair of brush cap assemblies located adjacent the central bore of the diffuser:

FIG. 11 is a front elevational view of a radial diffuser according to the present invention depicting the brush cap assemblies extending axially inward to protrude beyond the radial channel members located on the diffuser;

FIG. 12 is a side elevational view of a radial diffuser similar to that depicted in FIG. depicting details of the brush cap assemblies, including a channel formed within each cap assembly to direct air toward the brushes in the motor-fan unit;

FIG. 16 is a plan view of a ported diffuser according to the present invention depicting a pair of brush cap assemblies located adjacent the central bore of the diffuser:

FIG. 17 is a front elevational view of a ported diffuser according to the present invention depicting the brush cap assemblies extending axially inward to protrude beyond the radial channel members located on the diffuser;

FIG. 18 is a side elevational view of a ported diffuser similar to that depicted in FIG. 10 depicting details of the brush cap assemblies, including a channel formed within each cap assembly to direct air toward the brushes in the motor-fan unit;

BEST MODE FOR CARRYING OUT THE INVENTION

Figure 1:
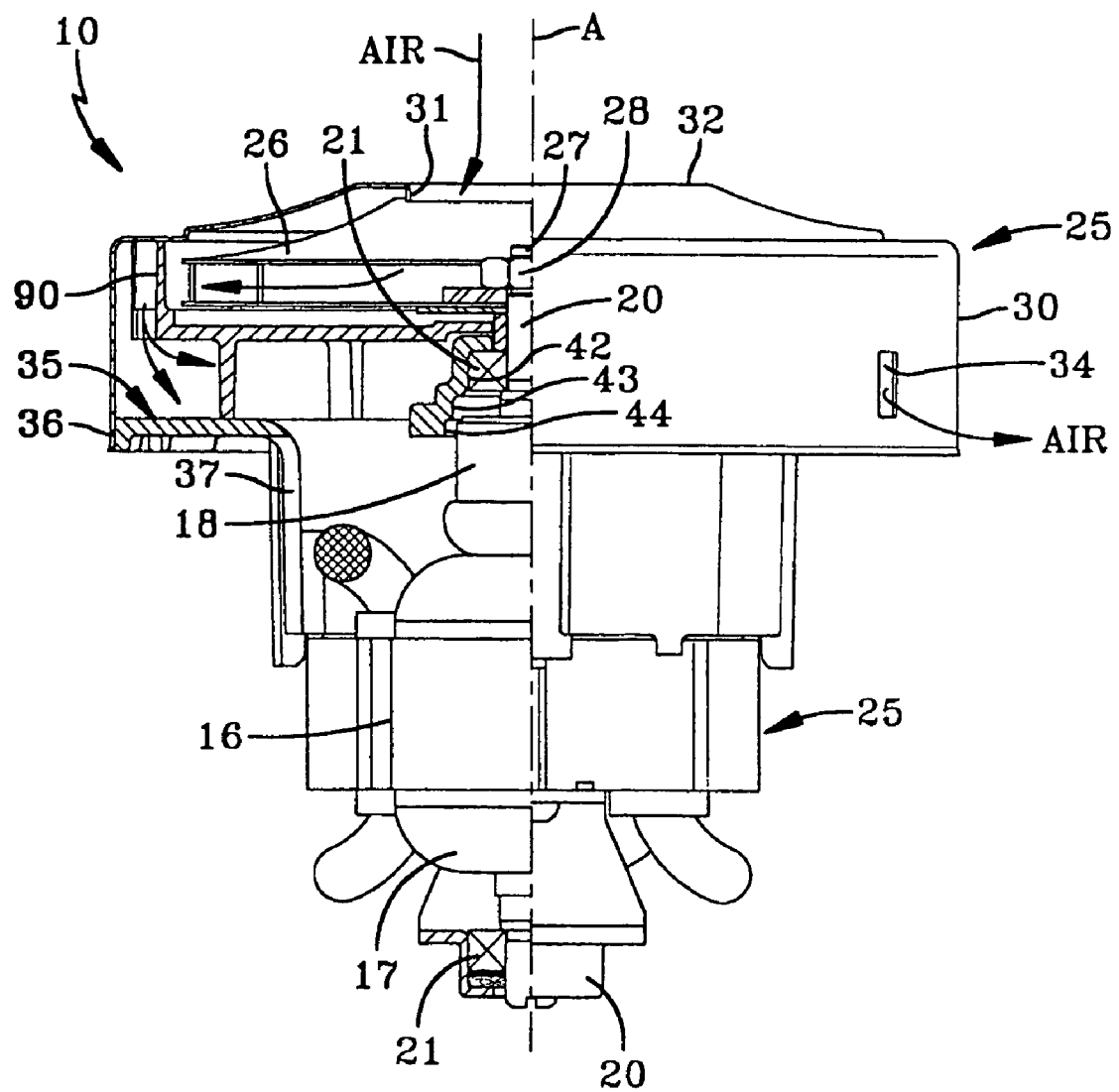
FIG. 1 is a partially sectioned front elevational view of a motor-fan unit according to the present invention with the cover removed to show details of the motor assembly, end plate assembly, diffuser assembly, and fan assembly.

A motor-fan unit, generally indicated by the numeral 10 in the accompanying Figures, generally includes a motor assembly 15 and a fan assembly 25. Since motor and fan assemblies 15,25 are widely used in the art, only a general description of their components will follow. As shown in FIG. 1, the motor-fan unit 10 includes an electric motor 16 with an armature or winding 17, a commutator 18, and brushes 19 which provide a connection from the power source to the commutator 18 and the windings 17. A shaft 20 is Supported on suitable bearings such that it is freely rotatable and is connected to the commutator 18 so as to rotate therewith.

As shown in FIG. 1, the motor assembly is configured with the commutator 18 closest to the fan assembly 25. The fan assembly 25 of motor-fan unit 10 includes a fan 26 coupled to one end 27 of shaft 20, as by nut, such that it rotates therewith. The fan assembly 25 further includes a shroud 30 that encapsulates the fan 26. As is known in the art, the shroud 30 is provided with an axial aperture through which outside air is drawn by the fan 26. In the embodiment shown, shroud 30 includes a centrally located port 31 formed in a cover portion 32 of shroud 30 coaxially located with the axis A of shaft 20. The air is exhausted by the fan 26 which is received by a diffuser (to be described in detail later) which distributes the air as needed by the end use.

Figure 2:
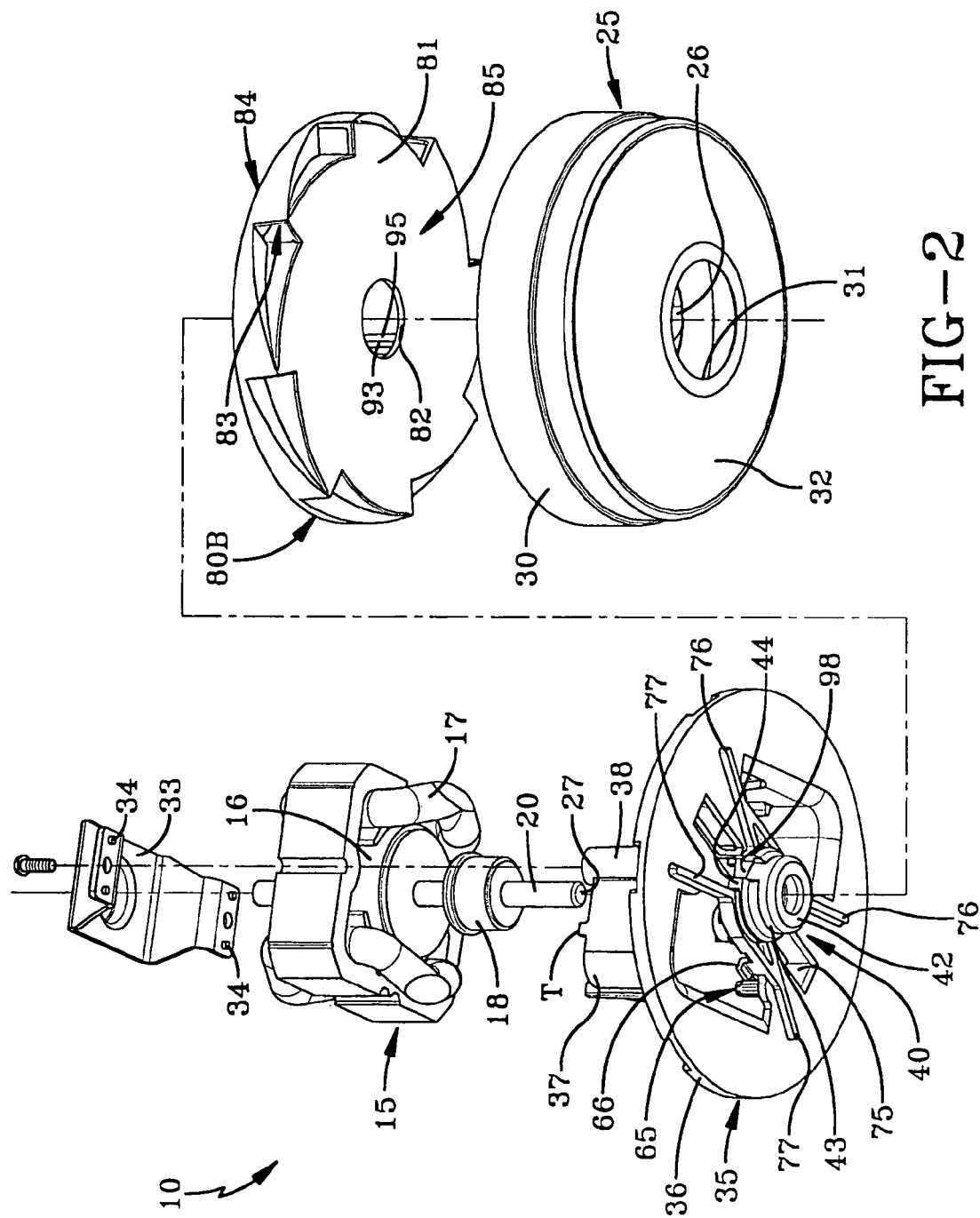
FIG. 2 is an exploded perspective top view of the motor-fan unit according to the present invention depicting details of the motor assembly, end plate assembly, diffuser assembly, and fan assembly.
Figure 3:
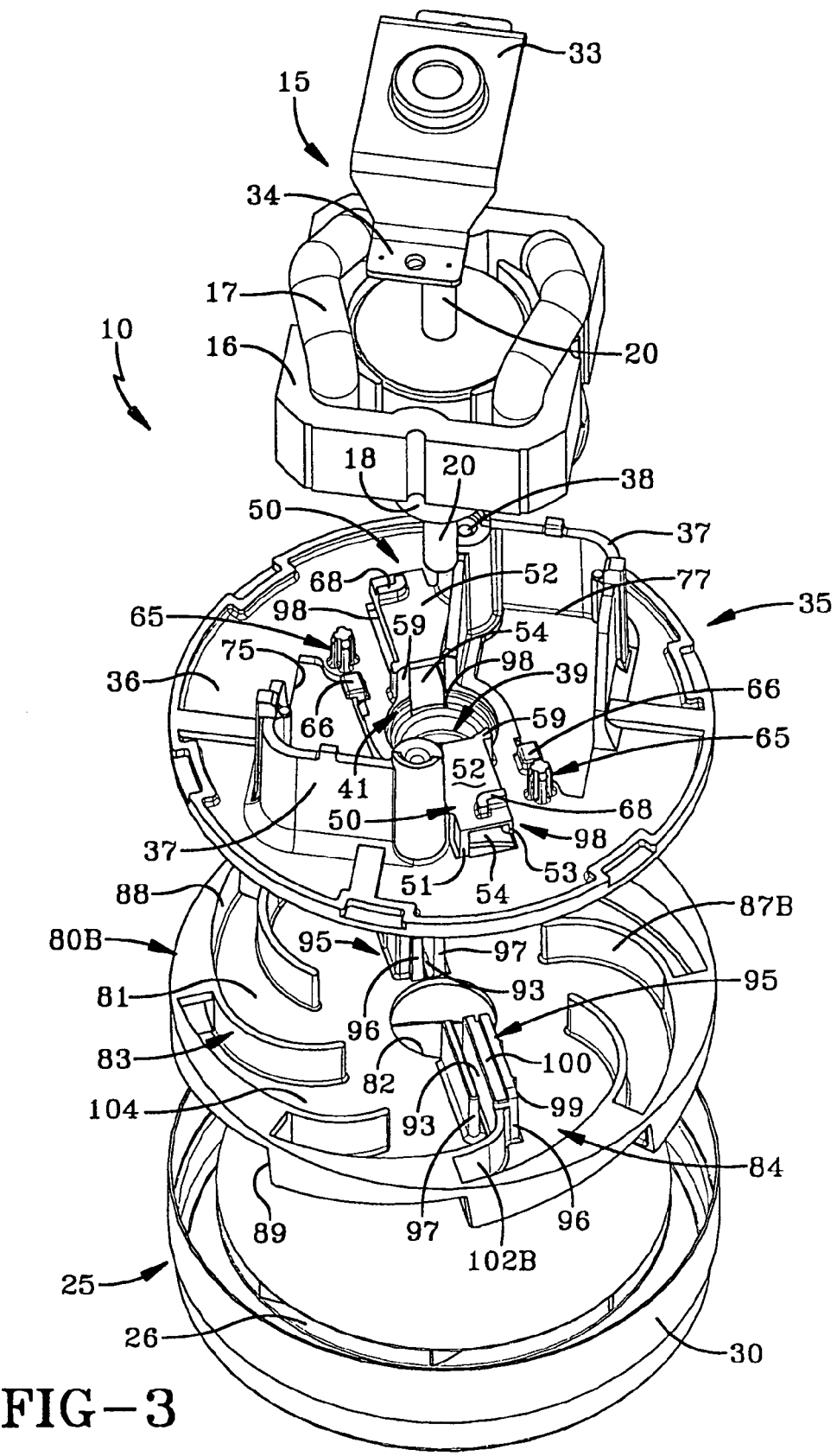
FIG. 3 is an exploded perspective bottom view of the motor-fan unit according to the present invention depicting details of the motor assembly, end plate assembly diffuser assembly, and fan assembly.
Figure 4:
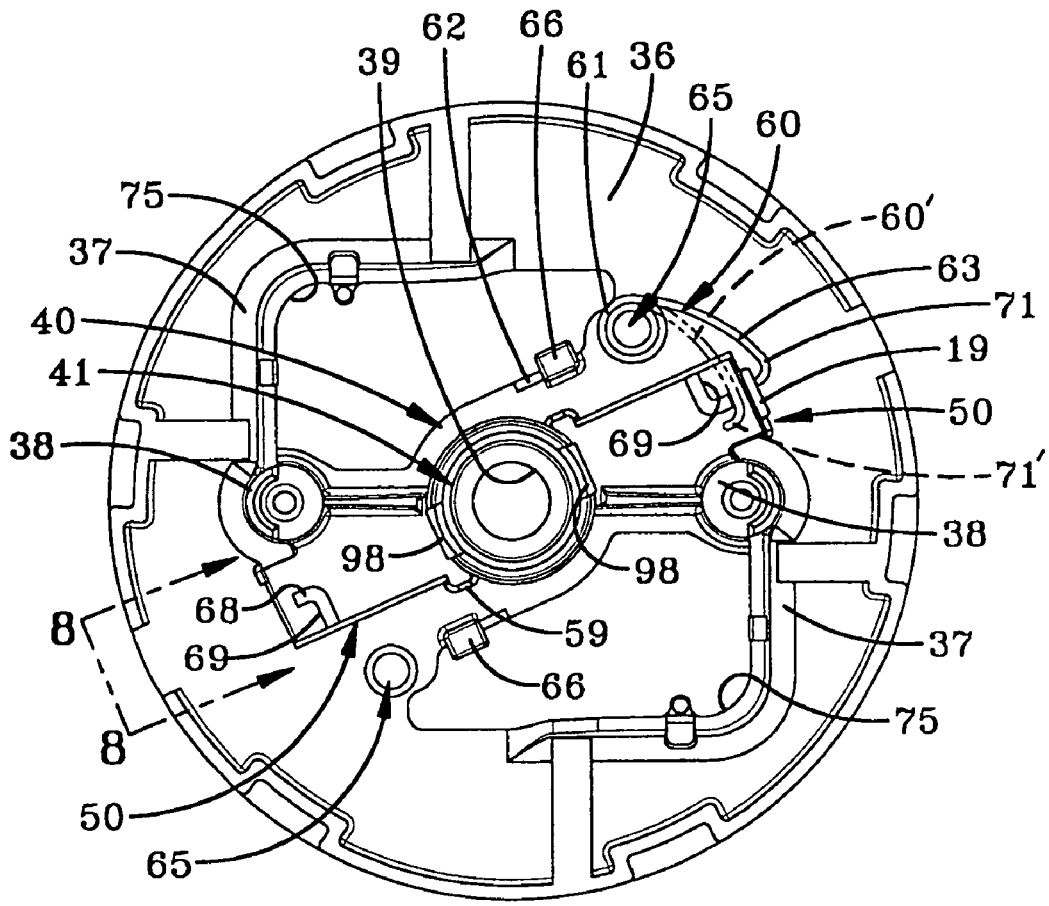
FIG. 4 is a plan view of the end plate depicting details of the motor-side of the end plate.

With reference to FIGS. 2-9, motor assembly 15 may be provided with an end plate assembly, generally indicated by the numeral 35, to enclose the motor and support brushes 19. The end plate assembly 35 generally includes a planar plate portion 36, which may be annular as shown, and, a motor bracket portion 37 extending from the plate portion toward the motor 16. As best shown in FIG. 4, the bracket portion 37 is adapted to Support the motor assembly 15. A fastening plate 33 has tabs 34 with holes therethrough for receiving fasteners that are secured into the receivers 38. The fasteners and the fastening plate 33 secure the motor assembly 15 to the end plate 35.

Figure 5:
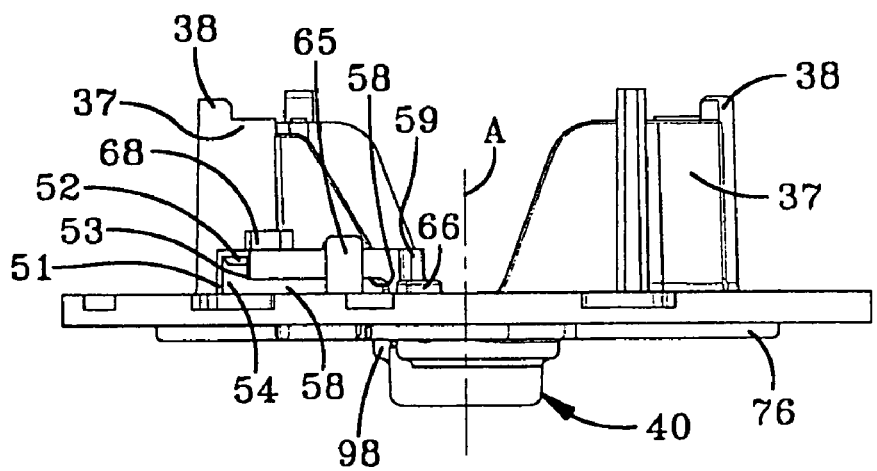
FIG. 5 is a front elevational view of the end plate assembly depicting further details of the end plate assembly, including a brush retainer assembly and motor attachment brackets.
Figure 6:
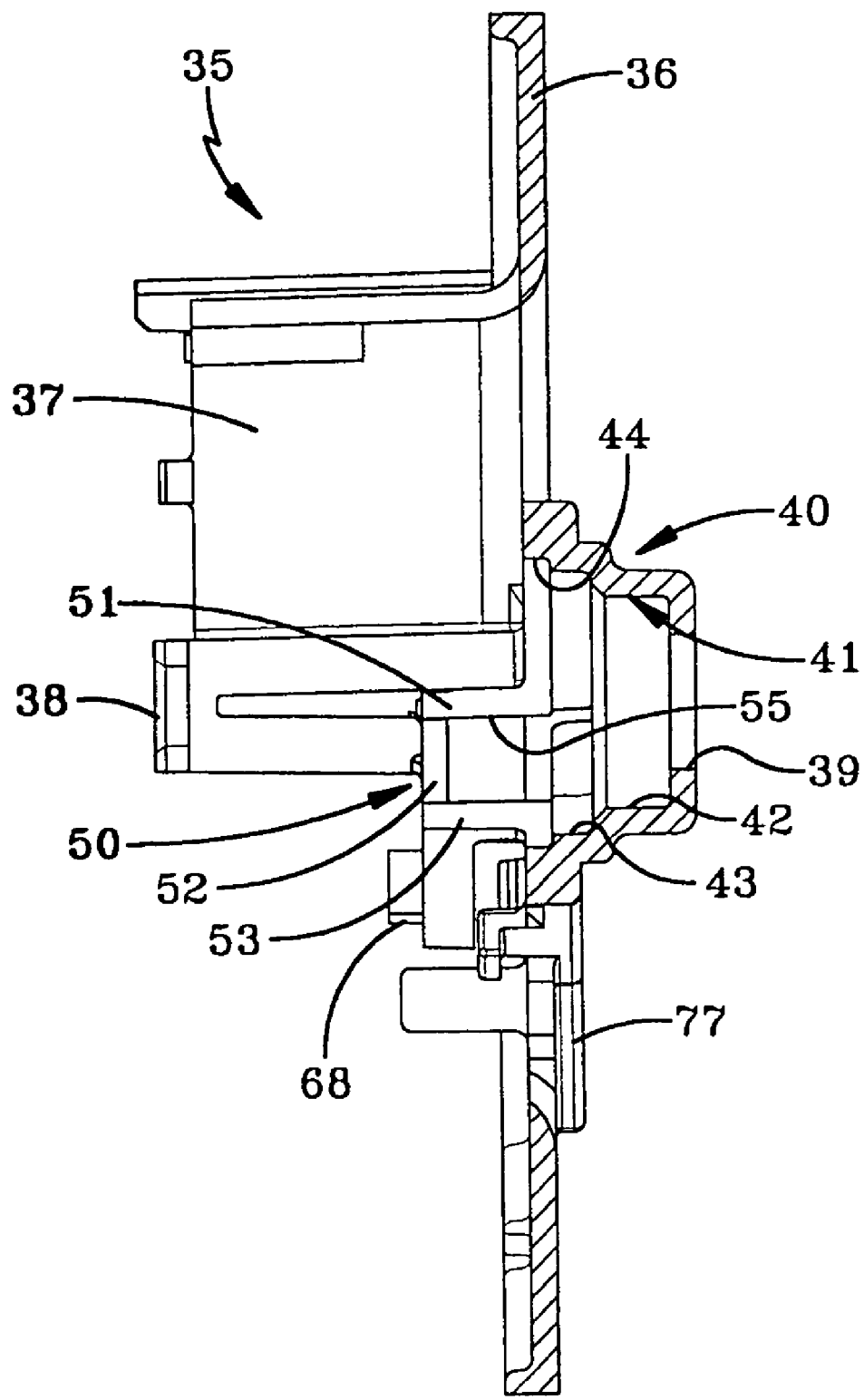
FIG. 6 is a partially sectioned right side elevational view of the end plate assembly depicting details of the commutator receiver.
Figure 7:
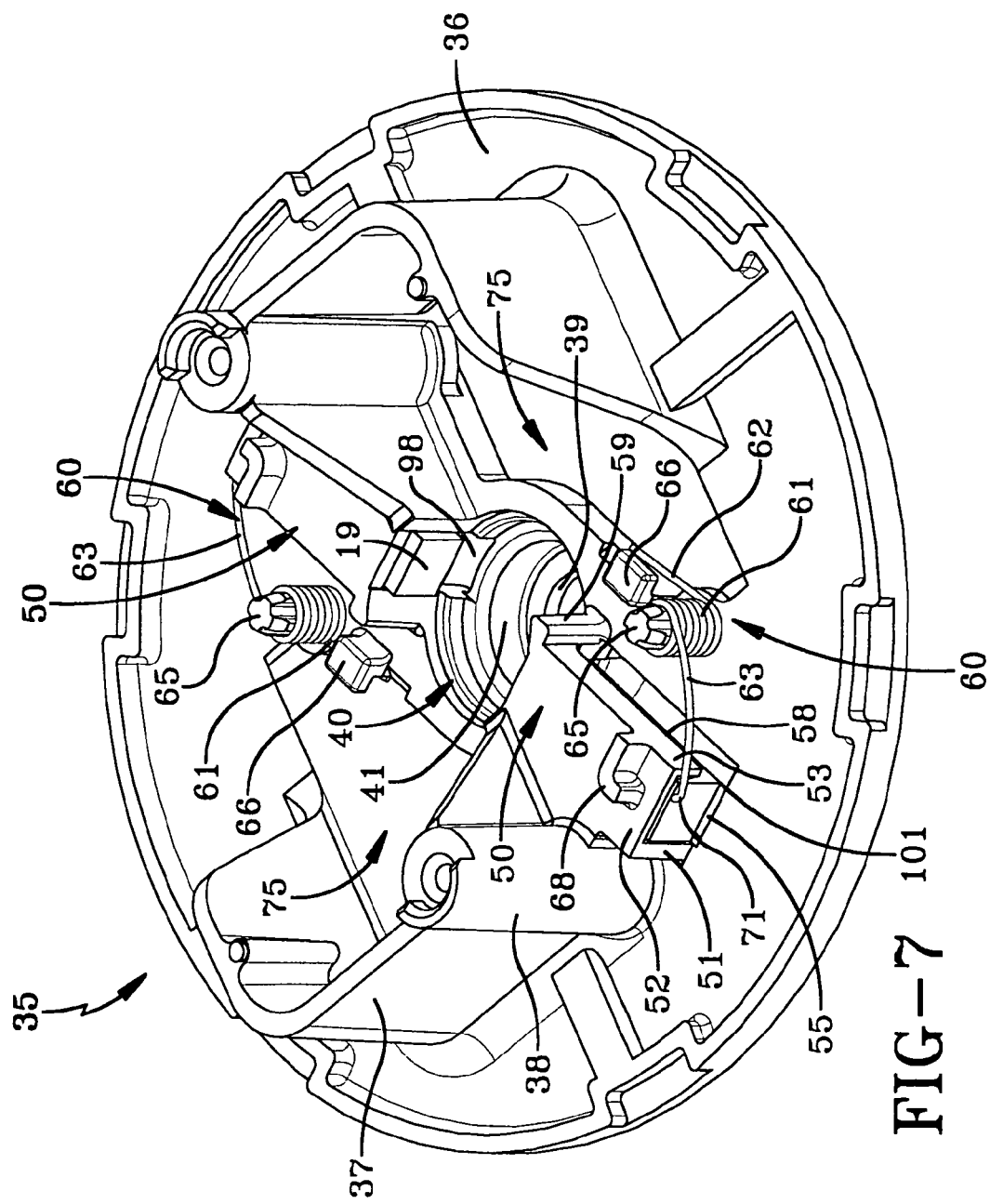
FIG. 7 is a perspective view of the end plate assembly depicting further details of the motor-side thereof, including the location of the brush retainers adjacent the commutator receiver.

End plate assembly 35 defines a central opening 39 which receives the shaft 20. Since, as shown in FIG. 1, the commutator 18 is located on the shaft 20 adjacent the end plate assembly 35, the end plate assembly 35 may be provided with a commutator receiver, generally indicated by the numeral 40, that receives commutator 1 8 and provides suitable clearance for the rotation of the commutator 18. As shown in FIG. 5, the commutator receiver 40 may bulge axially outwardly of plate portion 36 defining a well 41 in which at least a portion of the commutator 18 resides. Well 41 may also receive bearings (not shown) used to support shaft 20 such that it is freely rotatable. As shown, the commutator recess 40 may include a plurality of stepped concentric recesses 42, 43, 44, to accommodate the profile of the commutator 18 and bearings 21. In this way commutator 18 may be placed close to the fan assembly 25 and receive cooling air prior to the air's passage over the windings. In this way, the commutator 1 8 is more efficiently cooled improving the motor's performance.

Since, during the operation of the motor-fan unit 10, the brushes 19 contact commutator 18, end plate assembly 35 is provided with a pair of brush retainers, generally indicated by the numeral 50. The structure of each brush retainer 50 is largely identical with one being a mirror image of the other. Consequently, a description of only a single brush retainer 50 will follow. As best shown in FIGS. 4-8, the brush retainer 50 may be in the form of a channel-like member having three contiguous walls or members 51, 52, 53 that form open ends 54 to cradle the brush 19. Preferably, the retainers 50 face the motor assembly 15 to ease molding thereof. As shown in the Figures, brush retainer 50 opens toward the fan assembly 25 in a mouth 55 formed in the plate portion 36. A projection in the mold cavity may be used to create the open retainer 50. It will be appreciated that by providing an open retainer 50, mold design is greatly simplified and the use of sacrificial molding or subsequent machining necessary to create tubular brush retainers as used in the art is obviated, thereby reducing mold cycle time. Further, the formation of an open resilient type brush retainer 50 allows interference fitting of the brush 19 within the retainer 50 eliminating the use of retaining clips which are commonly used when attaching the brushes to a motor housing. As an alternative to the channel-like brush retainer 50 shown, suitable brush retainers 50 might include an L-shaped member or one or more posts used to locate the brush 19. The channel-like retainer 50, shown, may be formed as a single piece or have spaced portions suitably supporting the brush 19.

Figure 8:
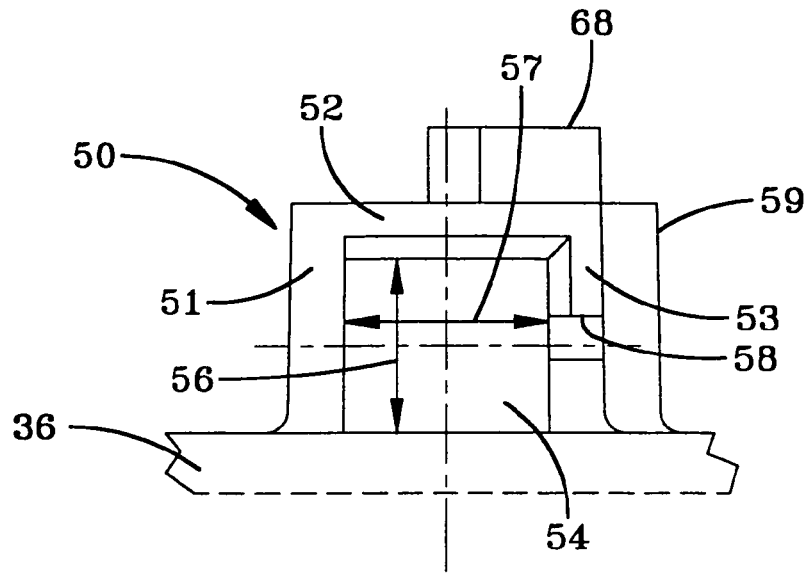
FIG. 8 is an enlarged partially sectioned side elevational view as might be seen along line 8-8 in FIG. 4 depicting details of a brush retainer according to the present invention.

In the embodiment shown, brush retainer 50 has a first wall 51 extending axially inward from the end plate 35, a second member 52 extending outward from and generally at a right angle to the first member 51. The second member is axially spaced from the plate 35 to define a vertical suitable clearance 56 for brush 19, and a third member 53 or tab extending axially toward the plate portion 36 to define a horizontal clearance 57 for receipt of brush 19. As discussed, members 51, 52, 53, may be spaced such that clearances 56, 57 create an interference fit between the brush 19 and retainer 50. As shown in FIG. 8, the third member 53 may not connect to the plate portion 36 leaving a gap or notch 58 between the plate portion 36 and the third member 53 along one side of the brush 19. A support member 59, such as a post, may extend axially from the plate 39 to support the cantilevered second and third member 52, 53 opposite first member 51. In the embodiment shown, the support member 59 is placed adjacent the brush retainer 50 near the edge 61 of retainer 50 closest to the commutator receiver 40. At this location, the support member 59 may further aid the brush retainer 50 in maintaining the position of the brush.

To ensure good contact between the brush 19 and commutator 18, the brush 19 biased into engagement with the commutator 18. To that end, a spring generally indicated by the numeral 60 may be used. Consequently, end plate 35 may be provided with a spring holder, generally indicated by the numeral 65 on which spring 60 or other biasing) member is mounted. In the embodiment shown, a coil spring 60 having a coil 61 a first leg 62 and a second leg 63 is employed to bias the brush 19 toward commutator 18. The coil 61 is press fit over spring holder 65 and the first leg 62 is fixed with a suitable clip such as the spring retaining first projection 66 formed on the surface of plate 35. While the first projection 66 may simply be a wall, an L-shape projection may be used, as shown, to hold the first leg 62 against the torsional force of the coil spring 60 and further prevent the first leg 62 from moving axially beyond the first projection 66 and coming free thereof. The second leg 63 is rotated such that it contacts the rear of brush 19 to urge it toward the commutator 18. Since the brush 19 may be inserted after the assembly of the motor 15, it may be necessary to preload the spring 60 to hold it in place. To that end, a second projection 68 may be provided on the surface of end plate 35 or on the spring retainer 50, as shown. Second projection 68 is located such that the second leg 63 of spring 60 is compressed creating torsional force within the spring 60 sufficient to hold the second leg 63 against the second projection 68. In the embodiment shown, an L-shape second projection 68 extends axially inward from the second member 52 of brush retainer 50 defining a recess 69 in which the end 71 of second leg 63 may be inserted to assume a preloaded condition 60' (FIG. 4). When the brush 19 is in place within retainer 50 the second leg 63 is compressed to clear the brush retainer 50 and any extending portion of the brush 19 and then placed in contact with the rear of brush 19 to urge the brush 19 toward commutator 18.

Figure 9:
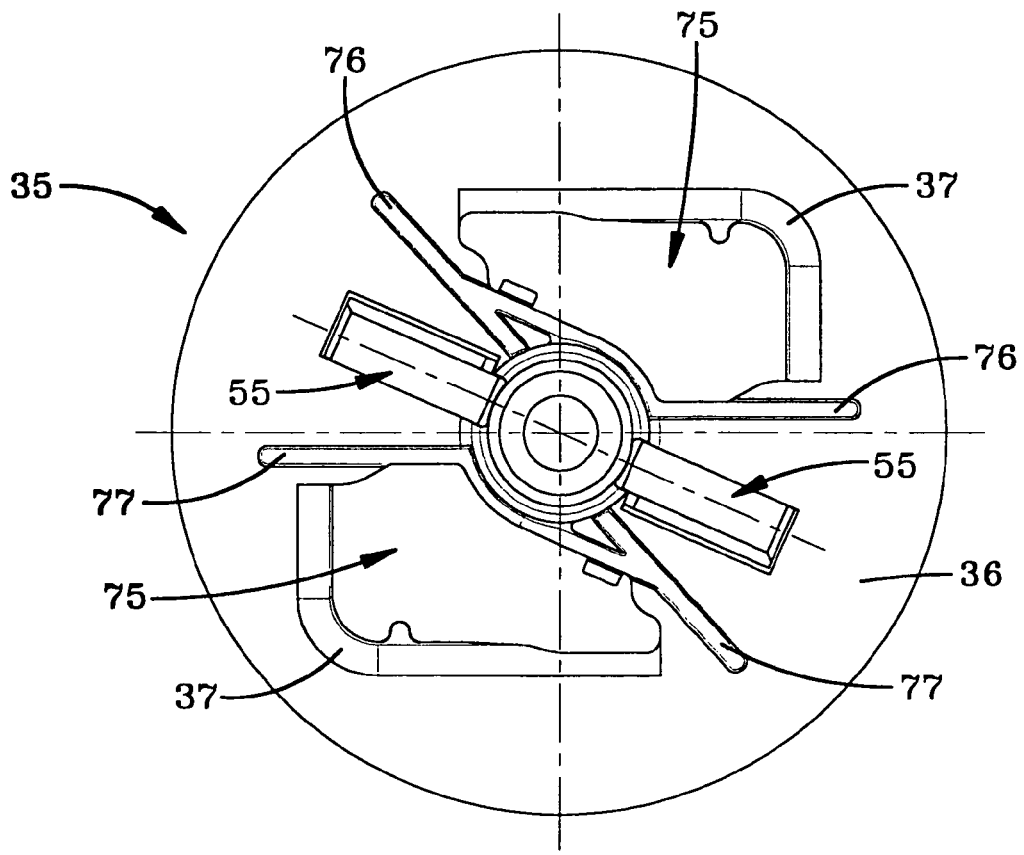
FIG. 9 is a plan view of an end plate according to the present invention depicting details of the diffuser side of the end plate assembly.

As previously mentioned, the brush retainers 50 are formed as open structures defining a mouth 55 within the end plate 35 that opens toward a diffuser assembly 80 and additionally extends into a portion of the commutator recess 40. The opening 55 allows cooling air from the fan assembly 25 to flow to the brushes 19, as will be described more completely below. A pair of cavities 75 are formed in the end plate 35 to direct air over the windings 17 or other parts of the motor assembly 15 as necessary. As shown in FIG. 9, these cavities 75 may be at least partially sealed from the mouth 55, to prevent particulate from the brushes 19 from being carried into the downstream areas of the motor assembly 15. To further prevent passage of particulate matter, dividers 76, 77 extend from the plate 37 and may comprise a bead of material extending adjacent cavities 75 between the cavities 75 and the mouth 55 of brush retainer 50. As shown, the dividers 76, 77 generally cordon off a section surrounding each of said mouths 55 and cavities 75 such that the plate portion is fluidically separated into four distinct portions. In addition, it should be appreciated that the motor brackets 37 extend from at least a portion of a perimeter of the end plate 35 that form the cavities 75, as shown in FIGS. 3, 4, 7, and 9.

Air from the fan assembly 25 may be distributed, as by a diffuser assembly generally indicated by the numeral 80. In accordance with the concepts of the present invention, a radial-type diffuser assembly 80A (FIGS. 10-15) or a ported type diffuser assembly 2, 3 and 80B (FIGS. 16-20) may be used. For the purposes of this invention, these diffuser assemblies 80A, 80B are interchangeable and are comprised of generally the same basic components. Notable distinctions between the ported and radial diffusers will be noted in the Figures, by using a numeral and letter combination to indicate components characteristic of the radial or ported diffuser assemblies 80A, 80B respectively. For general reference, the diffuser assembly will be referred to by the numeral 80. Further, the blades 86A, 87B or channels 86B, 87B formed on such a diffuser assembly 80 may be of 30 any number or configuration as required by the particular application for the motor-fan unit 10. Since the differences between the radial and ported diffusers 80A. 80B are largely inconsequential for purposes of the present invention, similar numbers will be used to refer to similar parts of each diffuser 80A, 80B.

Both of the diffusers 80A, 80B generally have a planar base member 81, which may be made annular to define a bore 82 about axis A. Blades 86A, 87A or channels 861B. 87B, collectively referred to as channeling members 83 extend from one or more of the base member's sides 84, 85. In this regard, the radial diffuser 80A and ported (diffuser 80B are distinguished in that the structures used to channel the air drawn into the motor-fan unit 10 and the structures used to channel that air as it is pressurized by the fan assembly 25 differ. In particular, the radial diffuser 80A includes a plurality of circumferential blades 86B surrounding the fan 26 that are used to guide the air outwardly from the fan side 85, wherein a portion may be directed externally of shroud 30 through a plurality of ports 34 provided in the shroud 30. A second set of blades 87A formed on the motor-side 84 of the radial diffuser 80A channels a remaining portion of the air radially inwardly toward the center of the diffuser 80A. The blades 87A may be configured in any pattern, as required by the particular application, including the spiral or pinwheel pattern shown. In contrast to the radial diffuser 80A, a ported diffuser 80B has enclosed channels 86B, 87B formed in similar patterns to the blades 86A, 87A (pinwheel) to channel all the incoming and outgoing air as described above, but the shroud is completely enclosed.

Diffuser assemblies 80 are provided with a pair of brush cap assemblies 95 that coact with the brush retainer 50 to trap brush 19 therebetween. In general, brush cap 95 is a surface that substantially closes the open side 55 of brush retainer 50. To contact the brush 19 or otherwise penetrate the opening, the brush cap 95 may extend axially, taking on the form of a projection, toward the motor assembly beyond the channeling members 83, to a desired extent. Preferably, the brush cap 95 will not extend such that its contact with brush 19 would interfere with the proper assembly of the motor-fan unit 10. The brush cap 95 generally conforms to the contours of brush retainer mouth 55 and may be toleranced to provide a clearance that would allow dust from the brush 19 to escape through end 54 of retainer 50 facing commutator 18, during operation of the motor-fan unit 10. By doing so dust build-up on the brushes 19 is reduced, and the air flow cools the brushes 19 extending brush life. Further, the air escaping the brush retainer 50, defined by post 59 and walls 51, 52 at the radial interior extreme of retainer 50 at end 54 facing commutator 18, flows over commutator to cool the commutator 18 improving motor efficiency.

In the embodiment shown in FIGS. 1-21 brush cap assembly 95 has a generally rectangular shape to conform to the rectangular opening in the end plate assembly 35.

Figure 14:
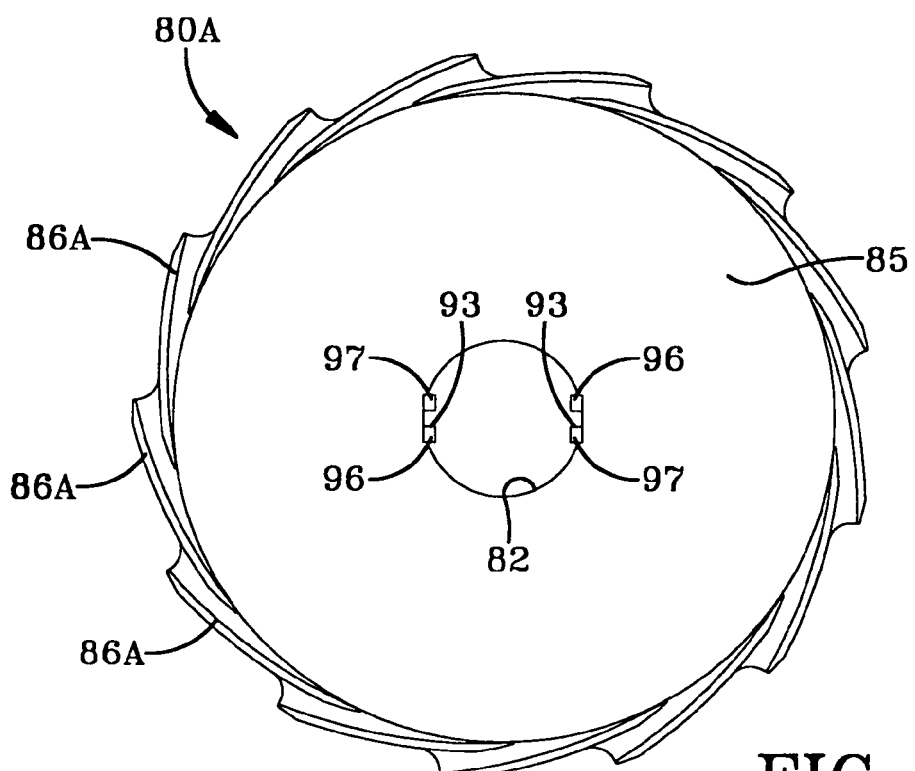
FIG. 14 is a plan view of a radial diffuser similar to that shown in FIG. 10 depicting details thereof, including a planer surface above which the fan of the motor-fan unit rotates drawing air through the circumferential inlets located about the surface.
Figure 15:
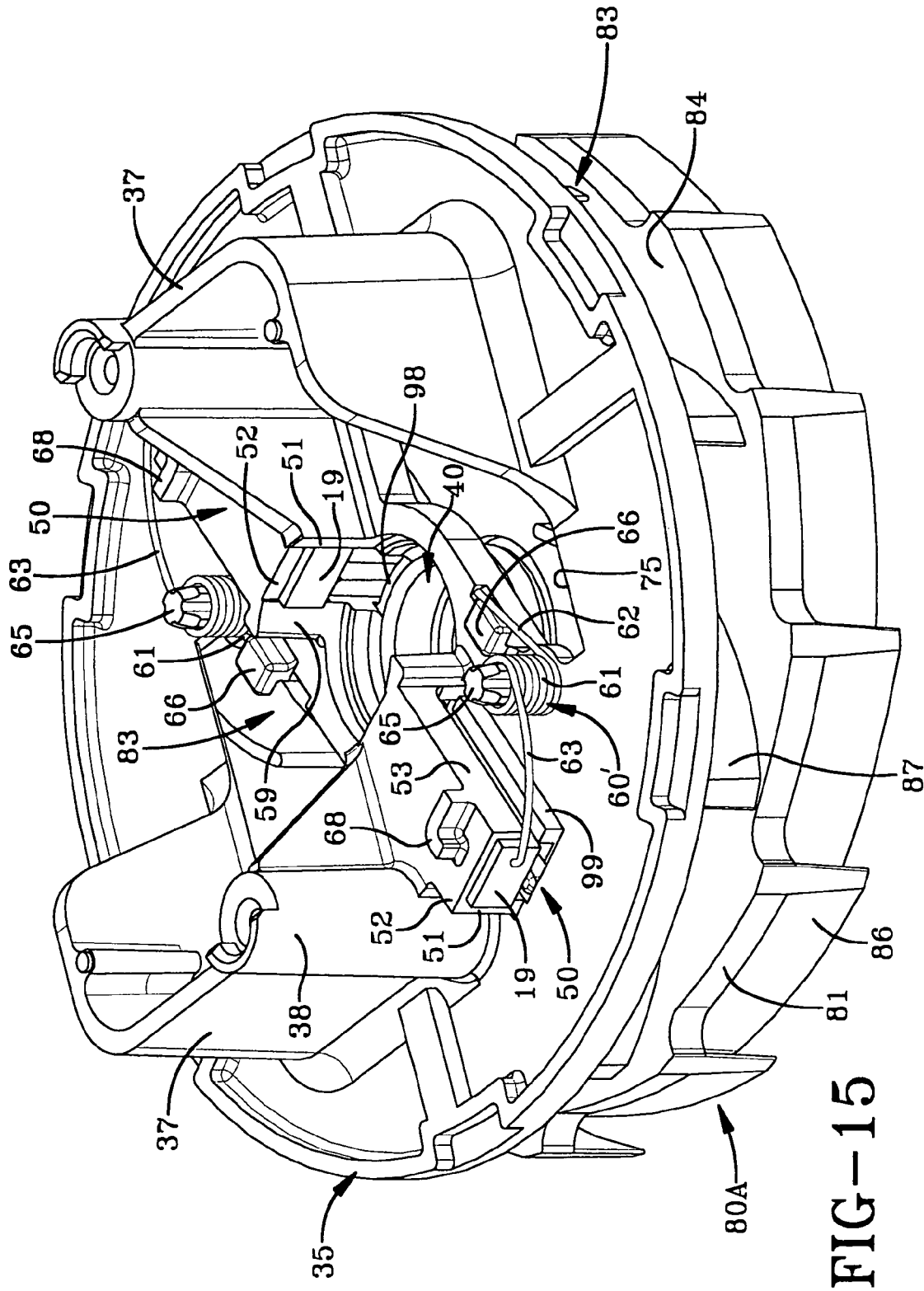
FIG. 15 is a perspective view of an end plate and radial diffuser according to the present invention shown attached to depict details of the cooperation of the brush retainer and brush cap assembly located on the respective end plate and diffuser to form a brush retaining enclosure that channels air to the brushes via the channel formed in the cap assembly.
Figure 19:
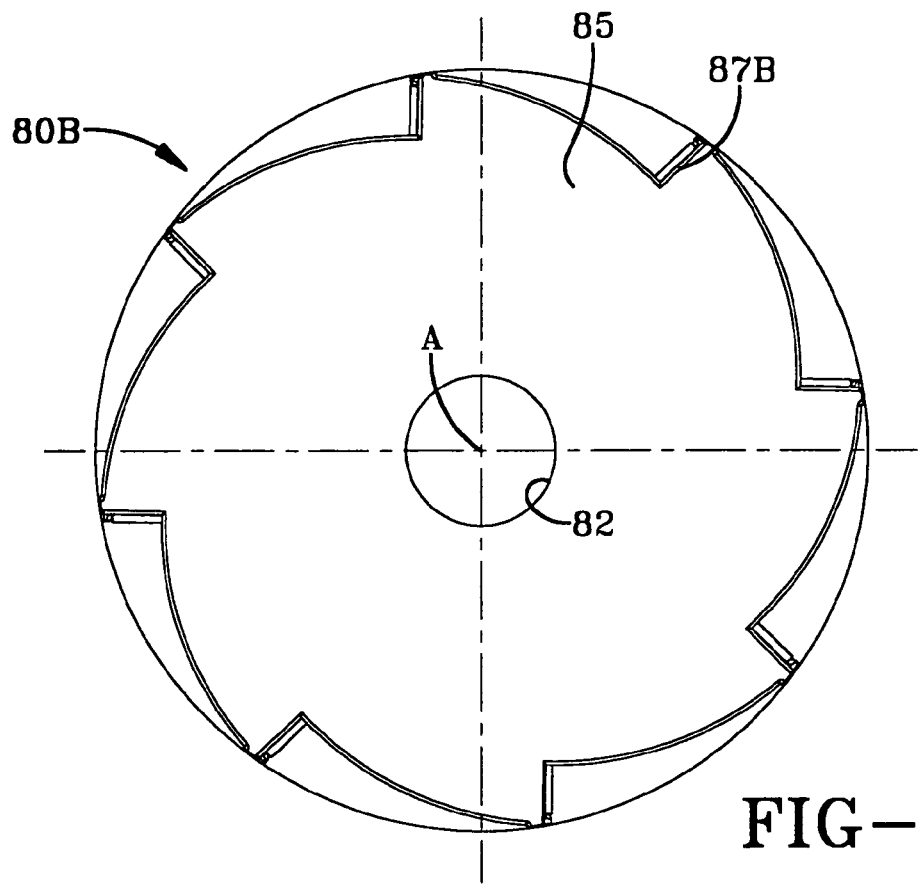
FIG. 19 is a perspective view of a ported diffuser according to the present invention depicting brush cap assemblies extending from the surface of the diffuser adjacent the central bore having air channels that cooperate with an adjacent diffuser channel.
Figure 20:
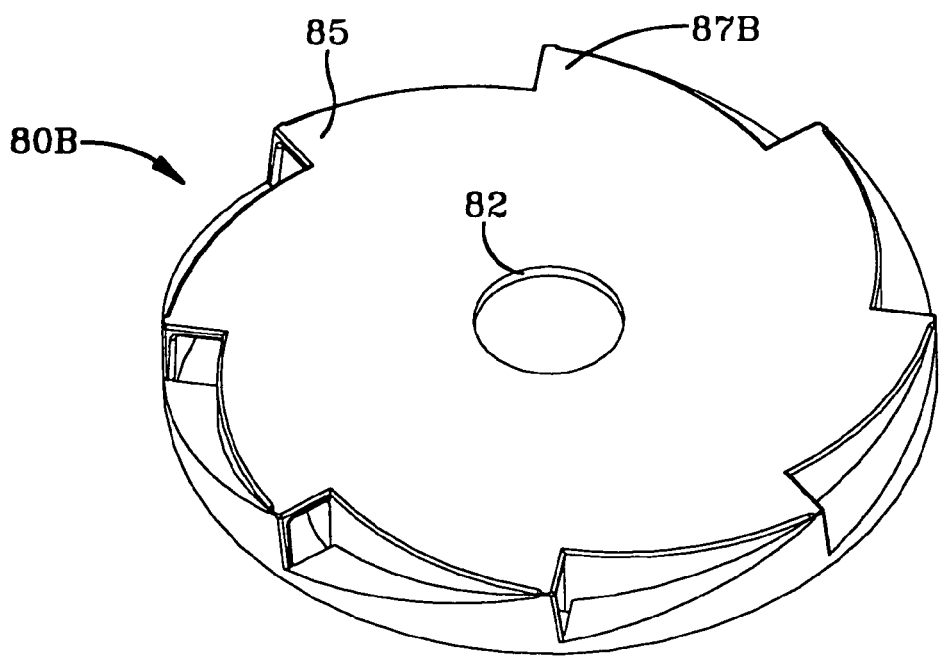
FIG. 20 is a top plan view of a ported diffuser similar to that shown in FIG. 10 depicting details thereof, including a planer surface above which the fan of the motor-fan unit rotates drawing air through the circumferential inlets located about the surface.
Figure 21:
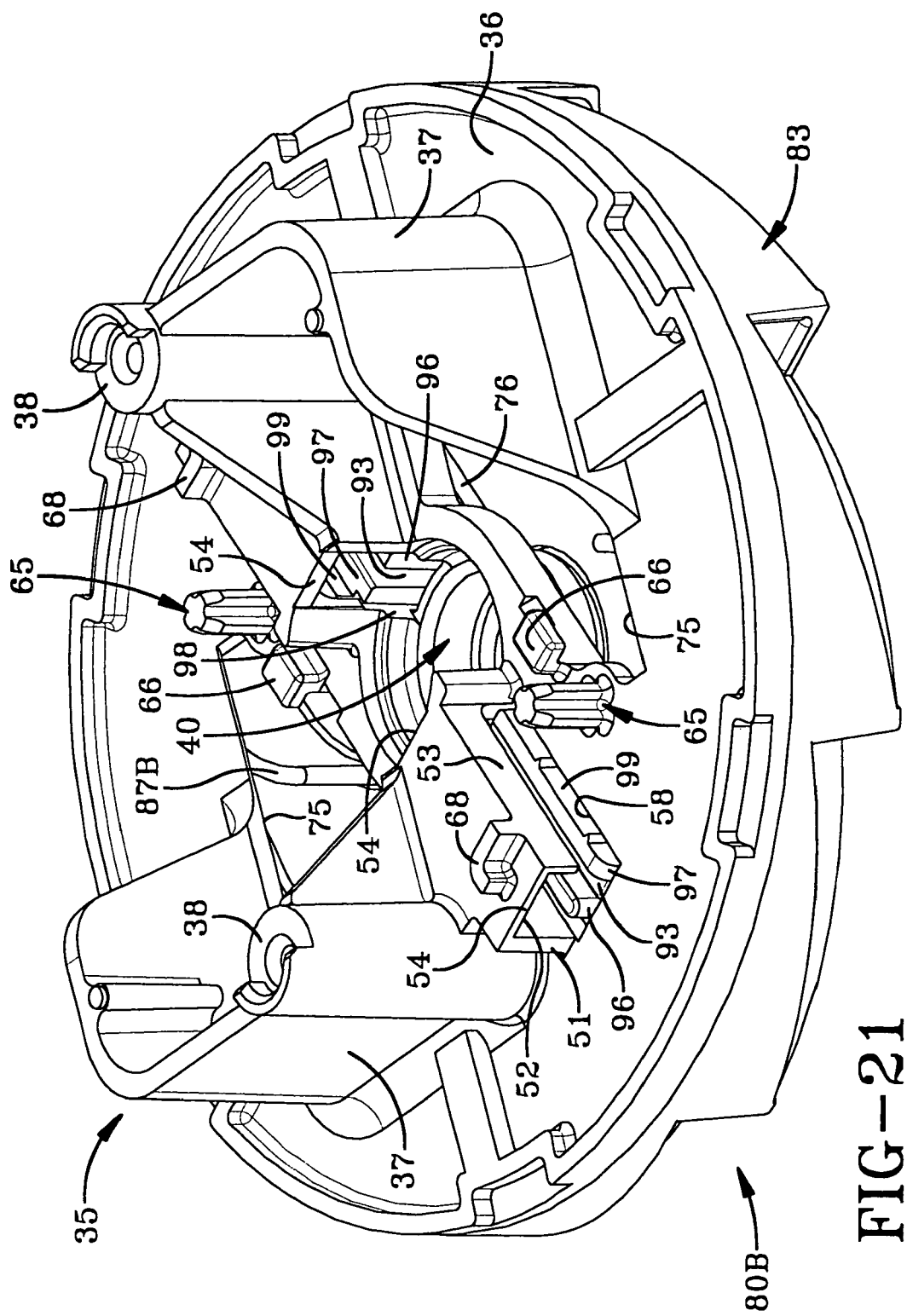
FIG. 21 is a perspective view of an end plate and ported diffuser according to the present invention shown attached to depict details of the cooperation of the brush retainer and brush cap assembly located on the respective end plate and diffuser to form a brush retaining enclosure that channels air to the brushes via the channel formed in the cap assembly.
Figure 22:
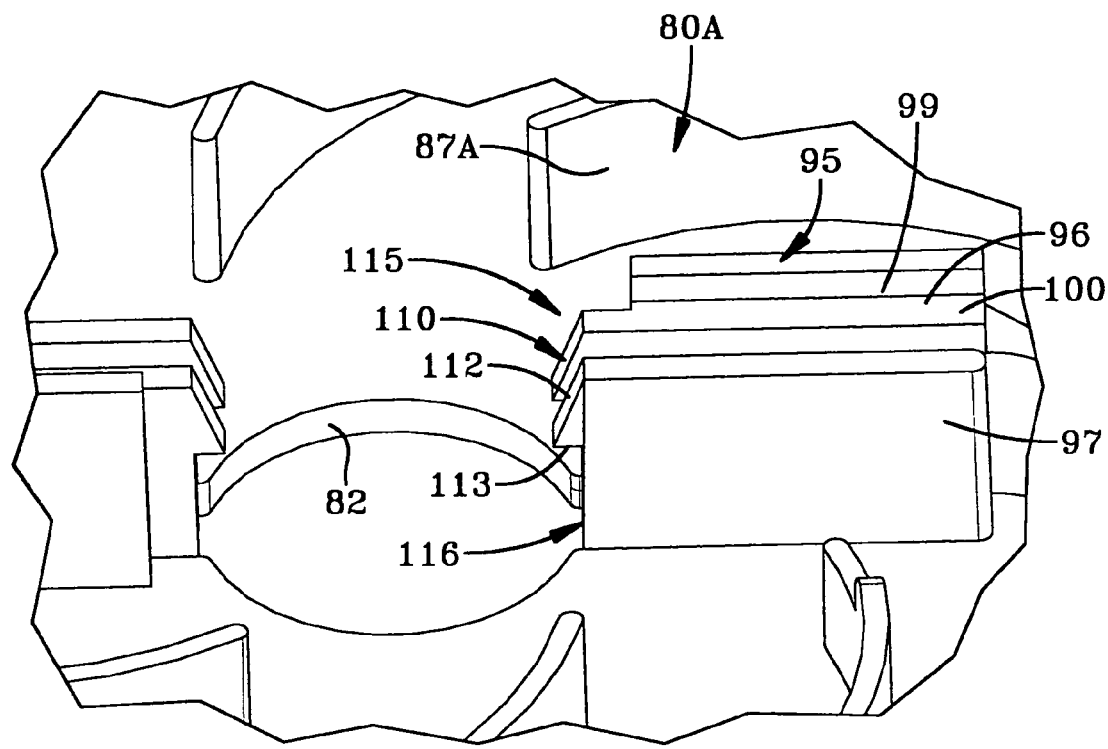
FIG. 22 is a perspective view of a radial diffuser according to the present invention enlarged to show details of an alternative brush cap assembly having snap-lock projections located thereon to effect attachment of the end cap assembly to the diffuser assembly.

Alternatively, as shown in FIGS. 21 and 22, a portion of brush cap assembly 95 may be provided with a projection surface to perform a coupling function, as will be described below. To channel air from the fan assembly 25 toward the brushes 19, brush cap 95 may be provided with channels 93 formed in a brush cap assembly. In the embodiment shown channels 93 are formed between a pair of upstanding members 96, 97 formed on the motor side 84 of diffuser 80A. Members 96, 97 are generally located adjacent the central opening 82 and may radially project to an extent into the opening as best shown in FIG. 14 and 19. To accommodate the extension of the brush cap members 96.97 into openings 82, recess openings 98 may be formed on the commutator receiver 40 as shown in FIG. 2. Advantageously, the extension of members 96, 97 an interference of friction fit between the members 96, 97 and commutator receiver 40 may be used in coupling the end plate 35 and diffuser 80.

Figure 13:
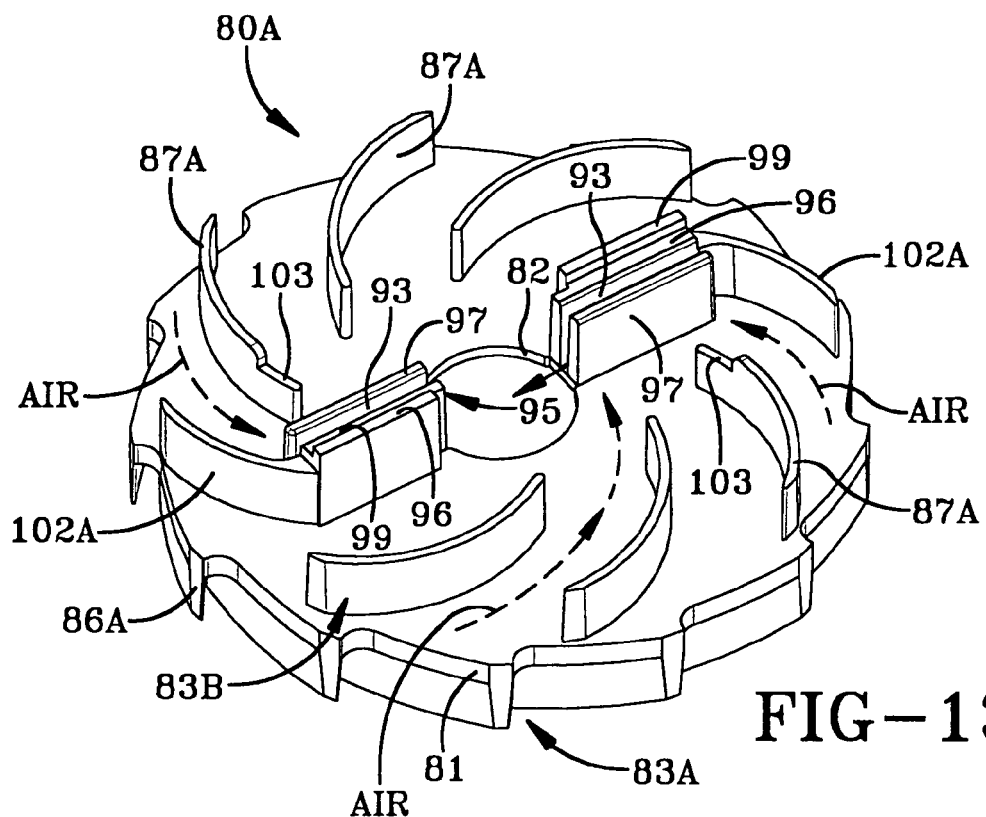
FIG. 13 is a perspective view of a radial diffuser according to the present invention depicting brush cap assemblies extending from the surface of the diffuser adjacent the central bore having air channels that cooperate with an adjacent diffuser channel.

The first and second members 96, 97 are of a similar height to the blades 87 in the radial type diffuser 80A to allow proper attachment of the diffuser 80A to the end plate 35. First and second members 96, 97 may extend axially inward beyond the blades 87A to an extent such that they extend into the openings 75 defined by brush retainers 50. First member 96 may have a raised edge 99 sized to fill the notch 58 between the plate portion 36 and the third member 53 of brush retainer 50. In this way, the brush cap assembly 95 encloses the brush 19 when the end plate 35 and diffuser 80A are coupled to one another. Adjacent the raised edge 99, the first member 96 may be provided with a landing 100 having the same height as second member 97 forming a recessed area that lies adjacent to the brush 19 when the diffuser 80A and end plate 35 are joined. The channel 93 opens toward motor assembly 15 between landing 100 and second member 97 to distribute air generated by the fan assembly 25 across the exposed surface 101 of the brush 19 lying adjacent brush cap 95. The air channeled through the channel 93 helps to transport heat away from the brush 19 benefitting the motor's efficiency. A truncated blade 102A or truncated channel 102B, in a ported diffuser 80B, lies radially outward and immediately adjacent to the assembly 95 and may be formed adjacent first member 96. The blade 102A is shaped similar to blades 87A and channels the air entering the channel 93 toward central opening 82, as indicated by the arrows (FIG. 13). To receive the raised surfaces of end plate assembly 35 adjacent to assemblies 95, one or more of the blades 87A may be provided with a notch 103. In the embodiment shown in FIG. 13, the notches 103 occur on the blades 87A located adjacent the truncated blades 102A in the clockwise direction.

The ported diffuser 80B has similar assemblies 95 that, as best shown ha FIG. 3. extend axially inward of the planar portion 104 of diffuser assembly 80B. Here, tile brush cap assemblies 95 are only distinguished in that they are surrounded by channels 87B as opposed to blades 87A. Truncated channel 102B has smaller overall dimensions than channels 87B and undergoes a sharper radiused turn at 105 to accommodate the brush cap assemblies 95.

Figure 23:
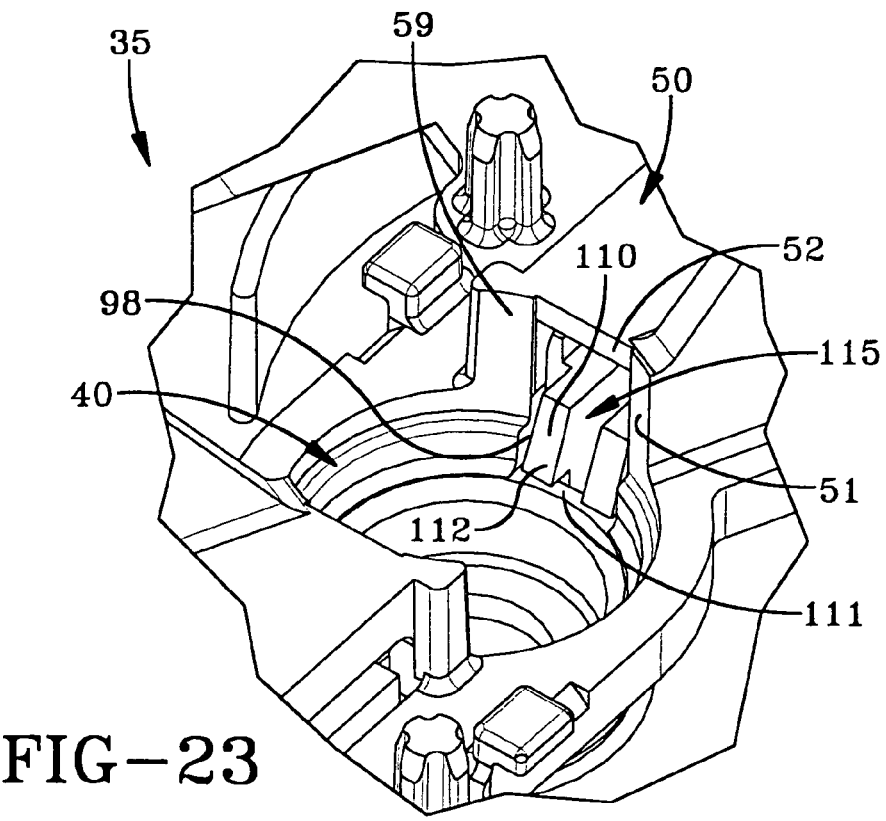
FIG. 23 is an enlarged perspective view of an end plate and radial diffuser according to the present invention having brush cap assemblies with snap lock projections that engage surfaces on the commutator receiver of the end plate to couple the end plate to the diffuser.

In either diffuser 80A, 80B, brush cap assemblies 95 may be used in coupling diffuser 80 to end plate 35. As described, a friction fit between brush cap assembly 95 and the walls of opening 55 or surfaces of commutator receiver 40 may help couple diffuser 80 and end cap 35. Alternatively, as best shown in FIGS. 22 and 23, brush cap assembly 95 may be provided with a projecting surface, generally indicated by the numeral 110 that performs a snap locking function in connection with a surface 111 of end cap 35. It will be appreciated that projecting surface 110 may be one of a number of configurations commonly used in the art to perform a snap locking function including a flexible tab, a rounded surface, or a tapered leading surface 112 and stop surface 13 combination as shown. As shown in FIG. 21, brush cap assemblies 95 may have triangular projections 115 extending radially inward from each member 96, 97. The tapered surface 12 of projection 115 slopes outwardly from a member 96 or 97 toward diffuser 80. The stop surface 113 extends inwardly from the tapered surface 12 and is located vertically on members 96 or 97 to provide a clearance at 116 for the receipt of a portion of the commutator receiver 40. When assembling diffuser 80 and end cap 35, the tapered surface 112 cause gradual deflection of either members 96, 97 and/or the wall of commutator receiver 40 such that upon the passage of tapered surface 112,m the wall rebounds into the clearance 116 beneath stop surface 113 with an audible indication to the assembler. Stop surface 113 engages surface 111 such that end cap 35 and diffuser 80 are not free to move apart coupling these components. While a radial diffuser is shown in FIGS. 22 and 23. snap-lock brush cap assemblies 95 may be used on a ported diffuser 80B, as well. Additionally, similar projections may be formed on other components of the present invention to effect tool free attachment thereof.

It should now be understood that a new and useful motor-fan unit has been disclosed in accordance with the patent laws. It will further be understood that various modifications and substitutions may be made in the described invention without the departing from the spirit thereof, and, to appreciate the scope of the invention, reference should be made to the following claims.

What is claimed is:

1. A motor-fan unit comprising:
   a motor assembly having a shaft, a commutator supported on said shaft, and a pair of brushes in electrical contact with said commutator;

a fan assembly having a fan coupled to said shaft;

an end plate assembly having a planar plate portion, said end plate assembly located between said fan assembly and said motor assembly, said planar plate portion having an opening through which said shaft passes, wherein said commutator is located near said opening;

a pair of brush retainers extending from said planar plate portion toward said motor assembly and positioned adjacent said commutator, said brush retainers having an open end adapted to receive a corresponding one of said brushes;

a pair of motor brackets extending from said planar plate portion toward said motor, said pair of motor brackets adapted to support said motor assembly; and a diffuser having at least one channel, said diffuser located between said end plate assembly and said fan assembly, said diffuser maintaining a bore through which said shaft is received;

wherein said planar plate portion maintains at least one cavity disposed therethrough, such that at least one of said motor brackets extends from a perimeter of said cavity, and said at least one cavity opens into said at least one channel maintained by said diffuser.

2. The motor-fan unit of claim 1, wherein said motor brackets are in a supporting relation to at least one of said brush retainers.

3. The motor-fan unit of claim 2, wherein said motor brackets include a receiver to secure said motor assembly to said end plate assembly.

4. The motor-fan unit of claim 1, wherein at least one of said motor brackets extends in a direction that is opposite said diffuser.

* * * * *